July 23, 1974 R. J. SCHOERNER Re. 28,078
INSULATED ALUMINUM ALLOY MAGNET WIRE
Original Filed April 7, 1969
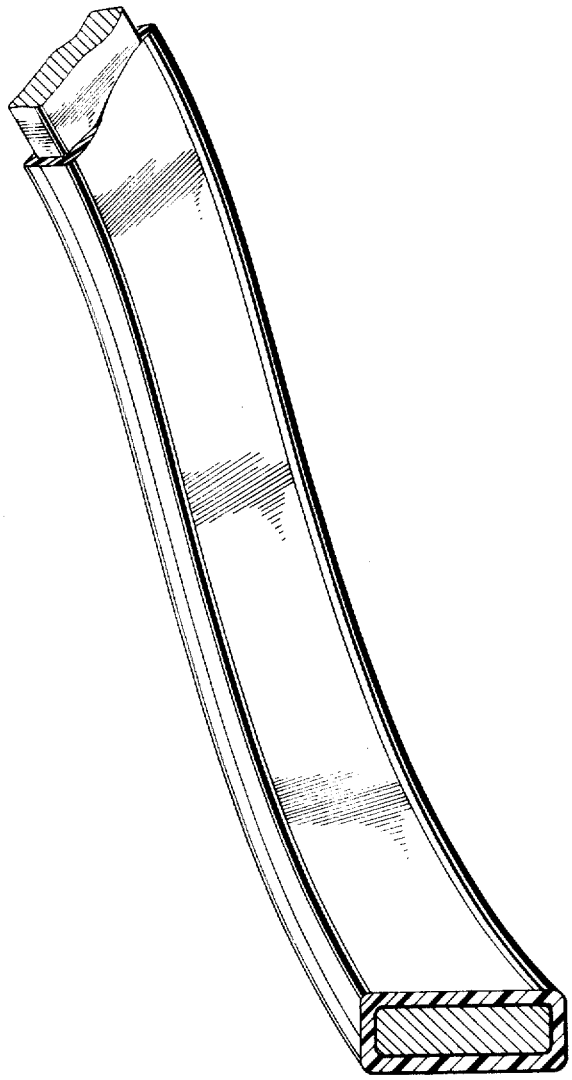

United States Patent Office

Re. 28,078
Reissued July 23, 1974

28,078

INSULATED ALUMINUM ALLOY MAGNET WIRE

Roger J. Schoerner, Carrollton, Ga., assignor to Southwire Company, Carrollton, Ga.

Original No. 3,513,252, dated May 19, 1970, Ser. No. 814,201, Apr. 7, 1969, which is a continuation-in-part of application Ser. No. 795,038, Jan. 29, 1969, which is a continuation-in-part of application Ser. No. 779,376, Nov. 27, 1968, which in turn is a continuation-in-part of application Ser. No. 730,933, May 21, 1968, all now abandoned. Application for reissue Oct. 12, 1972, Ser. No. 296,941

Int. Cl. H01b *5/08*

U.S. Cl. 174—120 SR 20 Claims

Matter enclosed in heavy brackets [ ] appears in the original patent but forms no part of this reissue specification; matter printed in italics indicates the additions made by reissue.

ABSTRACT OF THE DISCLOSURE

An insulated solid magnet wire, prepared from an aluminum alloy wire having an acceptable electrical conductivity of at least sixty-one percent (61%) based on the International Annealed Copper Standard and a minimum of fifteen percent (15%) ultimate elongation, has improved physical properties of increased tensile strength and fatigue resistance when compared to conventional magnet wire. The aluminum alloy wire contains substantially evenly distributed iron aluminate inclusions in a concentration produced by the addition of more than about 0.30 weight percent iron and no more than 0.15 weight percent silicon to an alloy mass containing less than about 99.70 weight percent aluminum and trace quantities of conventional impurities normally found within a commercial aluminum alloy. The substantially evenly distrbuted iron aluminate inclusions are obtained by continuously casting an alloy consisting essentially of less than about 99.70 weight percent aluminum, more than 0.30 weight percent iron, no more than 0.15 weight percent silicon and trace quantities of typical impurities to form a continuous aluminum alloy bar, hot-working the bar substantailly immediately after casting in substantially that condition in which the bar is cast to form continuous rod which is subsequently drawn into wire without intermediate anneals and annealed after the final draw. After annealing, the wire has the aforementioned novel and unexpected properties of a minimum of fifteen percent (15%) ultimate elongation, electrical conductivity of at least sixty-one percent (61%) of the International Annealed Copper Standard and increased tensile strength, bendability and fatigue resistance.

CROSS-REFERENCE TO RELATED APPLICATIONS

This application is a continuation-in-part of my copending application Ser. No. 795,038 filed Jan. 29, 1969 which is in turn a continuation-in-part of my copending application Ser. No. 779,376 filed Nov, 27, 1968, which is in turn a continuation-in-part of my copending application Ser. No. 730,933 filed May 21, 1968, all now abandoned.

This invention relates to an insulated solid magnet wire and more particularly concerns an insulated magnet wire prepared from a wire having an acceptable electrical conductivity and improved tensile strength and bendability at a standard minimum ultimate elongation.

The use of various aluminum alloy wires (conventionally referred to as EC wire) as wire windings for electromagnets is well established in the art. Such alloys characteristcally having conductivities of at least sixty-one percent (61%) of the International Annealed Copper Standard (hereinafter sometimes referred to as IACS) and chemical constituents consisting of a substantial amount of pure aluminum and small amounts of conventional impurities such as silicon, vanadium, iron, copper, manganese, magnesium, zinc, boron and titanium.

Prior art aluminum alloy wire (EC wire) has proven acceptable in magnet wire applications only when low values for tensile strength are adequate. It has been found that conventional EC wire must be annealed to a dead soft condition (tensile strength of about 9,000 to 11,700 p.s.i.) before the ultimate elongation thereof increases to fifteen percent (15%) or above (an industry accepted minimum for magnet wire). When processing wire with a tensile strength as low as 9,000 to 11,700 p.s.i., great care must be taken to avoid undue breakage and undesired drawing of the wire. In fact, EC aluminum has generally proven unacceptable for use as magnet wire because of its low tensile strength at an acceptable percent elongation.

When a prior art EC aluminum wire, having the required conductivity, a relatively high tensile strength and a relatively low ultimate elongation, is subjected to repeated and quite often sharp bending during a magnet winding operation, it typically breaks or develops surface fractures due to fatigue at the point of bending. Similarly, use of a prior art EC aluminum wire having the required conductivity, a relatively low tensile strength, and a relatively high ultimate elongation in the previously mentioned manner has yielded unsatisfactory results because the required pulling forces frequently encountered tend to break the wire. Furthermore, it is quite difficult to manufacture an EC wire of relatively low tensile strength because the pulling forces applied during processing of the wire cause breakage of the wire or undersirable stretching and reduction of the wire.

Thus, it becomes apparent that a need has arisen within the industry for an insulated aluminum magnet wire which has both relatively high tensile strength and acceptably high ultimate elongation, and also possesses an ability to withstand numerous bends at one point and to resist fatiguing during processing of the wire. Therefore, it is an object of the present invention to provide an insulated aluminum magnet wire of accepable conductivity and improved physical properties such that the wire may be used as an electro-magnet winding. These and other objects, features and advantages of the present invention will become apparent to those skilled in the art from a consideration of the following detail description of the invention.

DESCRIPTION OF THE DRAWING

*The drawing shows an insulated wire of the present invention.*

In accordance with this invention, the present insulated solid magnet wire is prepared from an alloy containing less than about 99.70 weight percent aluminum, more than about 0.30 weight percent iron, and no more than 0.15 weight percent silicon. Preferably, the aluminum content of the prescent alloy comprises about 98.95 to less than about 99.45 weight percent with particularly superior results being achieved when from about 99.15 to about 99.40 weight percent aluminum is employed. Preferably, the iron content of the present alloy comprises about 0.45 weight percent to about 0.95 weight percent with particularly superior results being achieved when from about 0.50 weight percent to about 0.80 weight percent iron is employed. Preferably, the silicon content does not exceed 0.07 weight percent. The ratio between the percentage iron and percentage silicon must be 1.99:1 or greater. Preferably, the ratio between percentage iron and percentage silicon is 8:1 or greater.

Thus, if the present aluminum alloy contains an amount of iron within the low area of the present range for iron content, the percentage of aluminum must be increased rather than increasing the percentage of silicon outside the ratio limitation previously specified. It has been found that a properly processed insulated magnet wire, having aluminum alloy constitutents which fall within the above-specified ranges, possesses increased tensile strength at an acceptable ultimate elongation, acceptable conductivity and improved fatigue resistance.

The present solid aluminum alloy magnet wire is prepared by initially melting and alloying aluminum with the necessary amounts of iron or other constituents to provide the requisite alloy for processing. Normally, the content of silicon is maintained as low as possible without adding additional amounts to the melt. Typical impurities or trace elements are also present within the melt, but only in trace quantities such as less than 0.05 weight percent each with a total content of trace impurities generally not exceeding 0.15 weight percent. Of course, when adjusting the amounts of trace elements, due consideration must be given to the conductivity of the final alloy since some trace elements affect conductivity more severely than others. The typical trace elements include vanadium, copper, manganese, magnesium, zinc, boron and titanium. If the content of titanium is relatively high (but still quite low compared to the aluminum, iron and silicon content), small amounts of boron may be added to tie-up the excess titanium and keep it from reducing the conductivity of the wire. Iron is the major constituent added to the melt to produce the alloy of the present invention. Normally, about 0.50 weight percent iron is added to the typical aluminum component used to prepare the present alloy. Of course, the scope of the present invention includes the addition of more or less iron together with the adjustment of the content of all alloying constituents.

After alloying, the melted aluminum composition is continuously cast into a continuous bar. The bar is then hot-worked in substantially that condition in which it is received from the casting machine. A typical hot-working operation comprises rolling the bar in a rolling mill substantially immediately after being cast into a bar.

One example of a continuous casting and rolling operation, capable of producing continuous rod as specified in this application, is as follows.

A continuous casting machine serves as a means for solidifying the molten aluminum alloy metal to provide a cast bar that is conveyed in substantially the condition in which it solidified from the continuous casting machine to the rolling mill which serves as a means for hot-forming the cast bar into rod or another hot-formed product in a manner which imparts substantial movement to the cast bar along a plurality of angularly disposed axes.

The continuous casting machine is of conventional casting wheel type having a casting wheel with a casting groove partially closed by an endless belt supported by the casting wheel and an idler pulley. The casting wheel and the endless belt cooperate to provide a mold into one end of which molten metals is poured to solidify and from the other end of which the cast bar is emitted in substantially that condition in which it solidified.

The rolling mill is of conventional type having a plurality of roll stands arranged to hot-form the cast bar by a series of deformations. The continuous casting machine and the rolling mill are positioned relative to each other so that the cast bar enters the rolling mill substantially immediately after solidification and in substantially that condition in which it solidified. In this condition, the cast bar is at a hot-forming temperature within the range of temperatures for hot-forming the cast bar at the initiation of hot-forming without heating between the casting machine and the rolling mill. In the event that it is desired to closely control the hot-forming temperature of the cast bar within the conventional range of hot-forming temperatures, means for adjusting the temperature of the cast bar may be placed between the continuous casting machine and the rolling mill without departing from the inventive concept disclosed herein.

The roll stands each include a plurality of rolls which engage the cast bar. The rolls of each roll stand may be two or more in number and arranged diametrically opposite from one another or arranged at equally spaced positions about the axis of movement of the cast bar through the rolling mill. The rolls of each roll stand of the rolling mill are rotated at a predetermined speed by a power means such as one or more electric motors and the casting wheel is rotated at a speed generally determined by its operating characteristics. The rolling mill serves to hot-form the cast bar into a rod of a cross-sectional area substantially less than that of the cast bar as it enters the rolling mill.

The peripheral surfaces of the rolls of adjacent roll stands in the rolling mill change in configuration; that is, the cast bar is engaged by the rolls of succesive roll stands with surfaces of varying configuration, and from different directions. This varying surface engagement of the cast bar in the roll stands functions to knead or shape the metal in the cast bar in such manner that it is worked at each roll stand and also to simultaneously reduce and change the cross-sectional area of the cast bar into that of the rod.

As each roll stand engages the cast bar, it is desirable that the cast bar be received with sufficient volume per unit of time at the roll stand for the cast bar to generally fill the space defined by the rolls of the roll stand so that the rolls will be effective to work the metal in the cast bar. However, it is also desirable that the space defined by the rolls of each roll stand not be overfilled so that the cast bar will not be forced into the gaps between the rolls. Thus, it is desirable that the rod be fed toward each roll stand at a volume per unit of time which is sufficient to fill but not overfill, the space defined by the rolls of the roll stand.

As the cast bar is received from the continuous casting machine, it usually has one large flat surface corresponding to the surface of the endless band and inwardly tapered side surfaces corresponding to the shape of the groove in the casting wheel. As the cast bar is compressed by the rolls of the roll stands, the cast bar is deformed so that it generally takes the cross-sectional shape defined by the adjacent peripheries of the rolls of each roll stand.

Thus it will be understood that with this apparatus cast aluminum alloy rod of an infinite number of different lengths is prepared by simultaneous casting of the molten aluminum alloy and hot-forming or rolling the cast aluminum bar.

The continuous rod produced by the casting and rolling operation is then processed in a reduction operation designed to produce continuous wire of various gauges between eight (8) gauge AWG (cross-sectional diameter or greatest perpendicular distance between parallel faces of 0.128 inch) and forty (40) gauge AWG (cross-sectional diameter or greatest perpendicular distance between parallel faces of 0.0031). The unannealed rod (i.e., as rolled to f temper) is cold-drawn through a series of progressively constricted dies, without intermediate anneals, to form a continuous wire of desired diameter. If a cross-sectional shape other than round is desired, the drawn wire may be worked to a proper shape by cold-rolling or further drawing through appropriately shaped rollers or dies to produce the shaped wire. Typical cross-sectional shapes other than round are square and rectangular. At the conclusion of this drawing and optional shaping operation, the alloy wire will have an excessively high tensile strength and an unacceptably low ultimate elongation, plus a conductivity below that which is industry accepted as the minimum for an electrical conductor, i.e., sixty-one percent (61%) of IACS. The wire is then annealed or partially annealed to obtain a desired tensile strength and cooled, At the conclusion of the annealing operation, it is found that the annealed alloy wire has properties of acceptable minimum percent elongation together with unexpectedly improved tensile strength and percent conductivity and surprisingly increased bendability and fatigue resistance as specified in this application. The annealing operation may be continuous as in resistance annealing, induction annealing, convection annealing by continuous furnaces, or radiation annealing by continuous furnaces; or may be batch annnealed in a batch furnace. In addition, the present aluminum alloy wire may be partially annealed by resistance or induction annealing and then additionally annealed by batch annnealing. In a preferred embodiment of the invention, the present wire is in-line annealed by gas convection and/or radiation annnealing. When continuously annealing, temperatures of about 450° F. to about 1200° F. may be employed with annnealing times of about five (5) minutes to about 1/10,000 of a minute. Generally, however, a continuous annealing temperatures and times may be adjusted to meet the requirements of the particular overall processing operation so long as the desired tensile strength is achieved. In a batch annealing operation, a temperature of approximately 400° F. to about 750° F. is employed with residence times of about twenty-four (24) hours to about thirty (30) minutes. As mentioned with respect to continuous annnealing, in batch annnealing the times and temperatures may be varied to suit the overall process so long as the desired tensile strength is obtained. Simply by way of example, it has been found that the following tensile strengths in the present aluminum alloy magnet wire are achieved with the listed batch annealing tempertaures and times.

TABLE I

| Tensile strength | Temperature, ° F. | Time (hr.) |
|---|---|---|
| 12,000–14,000 | 650 | 3 |
| 13,000–15,000 | 550 | 3 |
| 15,000–17,000 | 520 | 3 |
| 17,000–22,000 | 480 | 3 |

During the continuous casting of this alloy, a substantial portion of the iron present in the alloy precipitates out of solution as iron aluminate intermediate compound ($FeAl_3$). Thus, after casting the bar contains a dispersion of $FeAl_3$ in a supersaturated solid solution matrix. The supersaturated matrix may contain as much as 0.17 weight percent iron. As the bar is rolled in a hot-worker operation immediately after casting, the $FeAl_3$ particles are broken-up and dispersed throughout the matrix inhibiting large cell formation. When the rod is then drawn to its final gauge size without intermediate annneals and then aged in a final annealing operation, the tensile strength, elongation and bendability are increased due to the small cell size and additional pinning of dislocations by preferential precipitation of $FeAl_3$ on the dislocation sites. Therefore, new dislocation sources must be activated under the applied stress of the drawing operation and this causes both the strength and the elongation to be further improved.

The properties of the present aluminum alloy wire are significantly affected by the size of the $FeAl_3$ particles in the matrix. Coarse precipitates reduce the percent elongation and bendability of the wire by enhancing nucleation, and thus, formation of large cells which, in turn, lowers the recrystallization temperature of the wire. Fine precipitates improve the percent elongation and bendability by reducing nucleation and increasing the recrystallization temperature. Grossly coarse precipitates of $FeAl_3$ cause the wire to become brittle and generally unusable. Coarse precipitates have a particle size of above 2,000 angstrom units and fine precipitates have a particle size of below 2,000 angstrom units.

Following the annealing operation, the aluminum alloy electrical conductor is continuously insulated in a standard magnet wire continuous insulating operaion. A typical insulating operation comprises passing the solid conductor through a bath of enamel. As the conductor passes through the bath, a continuous insulating enamel coat is applied around the conductor. The coated conductor is then baked in a continuous furnace. The insulating enamel should be one which is capable of insulating the solid conductor and the enamel should be of a thickness sufficient to insulate the solid conductor and withstand the physical hazards associated with winding of magnet wire. The preferred insulating material is an enamel such as the oleoresinous type, but other coatings such as fabrics, polyethylene, polypropylene, poly (vinyl chloride), polyurethanes, epoxies, a polyvinyl formal resin, a polyvinyl formal resin and an overcoat of nylon, a urethane modified polyvinyl formal resin, an acrylic resin, a polyurethane base and a nylon overcoat, a modified polyester base with a linear polyester overcoat, a polyimide resin, cotton yarn and polyesters may also be employed. Typically, thermoplastic materials are applied by means of an extrusion head which coats the conductor with the thermoplastic material as the conductor moves through the head.

A typical No. 12 AWG solid insulated magnet wire of the present invention is prepared from a solid wire which has physical properties of 15,000 p.s.i. tensile strength, ultimate elongation of twenty-five percent (25%), conductivity of sixty-one percent (61%) IACS, and benability of thirty (30) bends to break. Ranges of physical properties generally provided by a suitable No. 12 AWG wire prepared from the present alloy include tensile strengths of about 12,000 to about 17,000 p.s.i., ultimate elongations of about forty percent (40%) to about fifteen percent (15%), conductivities of about sixty-one percent (61%) to about sixty-three percent (63%), and number of bends to break of about forty-five (45) to about fifteen (15). Preferred wire suitable for use in the present invention have a tensile strength of between 13,000 and 15,000 p.s.i., an ultimate elongation of between thirty-five percent (35%) and twenty-five percent (25%), a conductivity of between sixty-one percent (61%) and sixty-three percent (63%) and number of bends to break of between thirty-five (35) and twenty (20).

A more complete understanding of the invention will be obtained from the following examples.

EXAMPLE 1

A comparison between prior uninsulated EC aluminum magnet wire and the uninsulated wire of the present aluminum magnet wire is provided by preparing an EC alloy with aluminum content of 99.73 weight percent, iron content of 0.18 weight percent, silicon content of 0.059 weight percent, and trace amounts of typical impurities. The present alloy is prepared with aluminum content of 99.45 weight percent, iron content of 0.34 weight percent, silicon content of 0.056 weight percent and trace amounts of typical impurities. Both alloys are continuously cast into continuous bars and hot-rolled into continuous rod in similar fashion. The alloys are then cold-drawn through successively constricted dies to yield No. 12 AWG continuous round wire. Sections of the wire are collected on separate bobbins and batch furnace-annealed at various temperatures and for various lengths of time to yield sections of the prior EC alloy and the present alloy of varying tensile strengths. Several samples of each section are tested in a device designed to measure the number of bends required to break each sample at a particular flexure point. Through uniform force and tension, the device fatigues each sample through an arc of approximately 135°. The wire is bent across a pair of spaced opposed mandrels having a diameter equal to that of the uninsulated wire. The mandrels are spaced apart a distance of about 1½ times the diameter of the uninsulated wire. One bend is recorded after the wire is deflected from a vertical disposition to one extreme of the arc, returned back to vertical, deflected to the opposite extreme of the arc, and returned back to the original vertical disposition. The speed of deflection, force and tension are substantially equal for all tested samples. The results are as follows:

TABLE II-A

| EC magnet wire | | Present magnet wire | |
|---|---|---|---|
| Tensile strength | No. of bends to break | Tensile strength | Average No. of bends to break |
| 10,000 | 44 | 13,700 | 44 |
| 12,500 | 25 | 14,000 | 40 |
| 13,500 | 22 | 15,200 | 33 |
| 14,000 | 14½ | 16,000 | 30 |
| 15,000 | 14 | 17,000 | 23 |
| 16,200 | 11 | 17,200 | 20 |
| 17,000 | 10 | 18,200 | 15 |
| 18,000 | 8¾ | 19,575 | 13 |
| 23,000 | 6 | 25,000 | 6 |
| 29,000 | 4 | 35,900 | 3½ |

Several samples of the No. 12 AWG uninsulated round magnet wire and EC alloy No. 12 AWG uninsulated round magnet wire, processed as perviously specified, are then tested for percent ultimate elongation by standard testing procedure. At the instant of breakage, the increase in length of the wire is measured. The percent ultimate elongation is then figured by dividing the initial length of the wire sample into the increase in length of the wire sample. The tensile strength of the wire sample is recorded as the pounds per square inch of cross-sectional diameter required to break the wire during the percent ultimate elongation test. The results are as follows:

TABLE II-B

| EC alloy wire | | Present alloy wire | |
|---|---|---|---|
| Tensile strength | Percent ultimate elongation | Tensile strength | Percent ultimate elongation |
| | | 13,700 | 30.5 |
| | | 14,000 | 29.4 |
| 12,500 | 13 | 15,200 | 25 |
| 13,500 | 12 | 16,000 | 19.5 |
| 14,000 | 11 | 17,000 | 15 |
| 15,000 | 8 | | |
| 16,200 | 4 | | |

EXAMPLES 2 THROUGH 7

Six aluminum alloys are prepared with varying amounts of major constituents. The alloys are reported in the following table.

TABLE III

| Example No. | Percent Al | Percent Fe | Percent Si |
|---|---|---|---|
| 2 | 99.73 | 0.180 | 0.059 |
| 3 | 99.52 | 0.385 | 0.063 |
| 4 | 99.46 | 0.450 | 0.056 |
| 5 | 99.36 | 0.540 | 0.064 |
| 6 | 99.275 | 0.680 | 0.015 |
| 7 | 99.20 | 0.750 | 0.030 |

The six alloys are then cast into six continuous bars and hot-rolled into six continuous rods. The rods are cold-drawn through successively constricted dies to yield No. 12 gauge round magnet wire. The wire produced from the alloys of Examples 2 and 4 are resistance annealed and the remainder of the examples are batch furnace annealed to yield the tensile strengths reported in Table IV. After annealing, each of the wires is tested for percent conductivity, tensile strength, percent ultimate elongation and average number of bends to break by standard testing procedures for each, except that the procedure specified in Example 1 is used for determining average number of bends to break. The results are reported in the following table.

TABLE IV

| Example No. | Conductivity in percent IACS | Tensile strength | Percent ultimate elongation | Average No. of bends to break |
|---|---|---|---|---|
| 2 | 62.8 | 15,200 | 8.3 | 16 |
| 3 | 61.3 | 15,175 | 28.4 | 28 |
| 4 | 61.5 | 15,175 | 37.8 | 29 |
| 5 | 61.5 | 15,175 | 35.6 | 29½ |
| 6 | 61.25 | 14,400 | 28.9 | 33 |
| 7 | 61.2 | 15,875 | 26 | 29 |

From a review of these results it may be seen that Example 2 falls outside the scope of the present invention in percentage of components. In addition, it will be noted for Example 2 that the percentage of ultimate elongation is somewhat lower than desirable and the average number of bends to break the sample is lower than the remaining examples.

EXAMPLE 8

An aluminum alloy is prepared with an aluminum content of 99.42 weight percent, iron content of 0.50 weight percent, silicon content of 0.055 weight percent and trace amounts of typical impurities. The alloy is cast into a continuous bar which is hot-rolled to yield a continuous rod. The rod is then cold-drawn through successively constricted dies to yield No. 12 AWG round wire. The wire is collected on a 30 inch bobbin until the collected wire weighs approximately 250 pounds. The bobbin is then placed in a cold General Electric Bell Furnace and the temperature therein is raised to 480° F. The temperature of the furnace is held at 480° F. for 3 hours after which the heat is terminated and the furnace cools to 400° F. The annealed wire is then passed through an enameling bath and insulated with enamel. Under testing it is found that the insulated alloy magnet wire has a conductivity of 61.6% IACS, a tensile strength of 16,700 p.s.i. and a percentage ultimate elongation of 19.8%.

EXAMPLE 9

Example 8 is repeated except the Bell Furnace temperature is raised to 500° F. and held for 3 hours prior to cooling. The annealed and insulated alloy wire has a conductivity of 61.4% IACS, a tensile strength of 14,200 p.s.i. and a percentage ultimate elongation of 27%.

EXAMPLE 10

Example 8 is repeated except the Bell Furnace temperature is raised to 600° F. and held 3 hours prior to cooling. The annealed and insulated alloy wire has a conductivity of 61.2% IACS, a tensile strength of 14,000 p.s.i. and a percentage elongation of 30%.

EXAMPLE 11

Example 8 is repeated except the Bell Furnace temperature is raised to 600° F. and held 1½ hours prior to cooling. The annealed and insulated conductor has a conductivity of 61.5% IACS, a tensile strength of 16,200 p.s.i. and a percentage elongation of 22.5%.

EXAMPLE 12

The alloy of Example 8 is cast into a continuous bar which is hot-rolled to yield a continuous f temper rod of ⅜ diameter. The rod is then cold-drawn through successively constricted dies to yield No. 14 AWG round wire. The wire is then redrawn on a Synchro Model BG–16 wire drawing machine which includes a Synchro Resistoneal continuous in line annealer. The wire is drawn to No. 28 AWG at a finishing speed of 3,300 feet per minute and the in line annealer is operated at 52 volts with a transformer tap setting at No. 8. The wire is then collected on a bobbin and batch furnace annealed as in Example 8 at a temperature of 500° F. and a time of 1½ hours. The annealed wire is then insulated by extruding a coat of polyester resin around the wire. The sample is tested and it is found that the annealed wire has a conductivity of 62% IACS, a tensile strength of 15,550 p.s.i. and a percentage ultimate elongation of 24.5%.

EXAMPLE 13

The alloy of Example 8 is cast into a continuous bar which is hot-rolled to yield a continuous f temper rod of ⅜ inch diameter. The rod is then cold-drawn on a Synchro Style No. F X 13 wire drawing machine which includes a continuous in line annealer. The rod is drawn to No. 12 AWG round magnet wire at a finishing speed of 2,000 feet per minute and the in line annealer voltage at preheater No. 1 is 35 volts, at preheater No. 2 is 35 volts, and at the annealer is 22 volts. The three transformer taps are set at No. 5. The annealed wire is continuously insulated by being passed through an extrusion head where a coat of oleoresinous type enamel is applied. The sample is tested and it is found that the annealed wire has a conductivity of 62% IACS, a tensile strength of 16,400 p.s.i. and a percentage ultimate elongation of 20%.

One of the more interesting aspects of the present magnet wire alloy is that during the annealing operation the percentage elongation increases at a higher tensile strength than when annealing EC magnet wire alloy. In addition, when annealing EC magnet wire alloy, one must take the wire alloy almost to a dead soft condition before the percentage elongation begins to improve. With the present alloy the percentage elongation improves more steadily as annealing times and temperatures are increased and it is possible to achieve an acceptable percentage elongation well before attaining a dead soft condition in the wire.

It should be understood that the present invention concerns insulated magnet wire and processes for its preparation. Magnet wire may assume many cross-sectional configurations and while the present disclosure has been primarily concerned with round magnet wire, the present invention also includues square and rectangular magnet wire.

While this invention has been described in detail with particular reference to preferred embodiments thereof, it will be understood that variations and modifications can be effected within the spirit and scope of the invention as described hereinbefore and as defined in the appended claims.

I claim:

1. *Wrought* aluminum alloy magnet wire having a minimum conductivity of sixty-one percent IACS, a diameter or greatest perpendicular distance between parallel faces of between 0.128 inches and 0.0031 inches, a percentage elongation of at least fifteen percent and a tensile strength of at least 12,000 p.s.i., said wire consisting essentially of from about 0.55 to about 0.95 weight percent iron; *about 0.015 to* [no more than] about 0.15 weight percent silicon; *from 0.0001 to* less than 0.05 weight percent each of trace elements selected from the group consisting of vanadium, copper, manganese, magnesium, zinc, boron, and titanium; and from about 98.95 to less than 99.45 weight percent aluminum, said alloy containing *from 0.004 to* [no more than] 0.15 total weight percent trace elements and having an iron to silicon ratio of 8:1 or greater.

2. Aluminum alloy magnet wire of claim 1 consisting essentially of from about 0.80 to about 0.95 weight percent iron; from about 0.07 to about 0.15 weight percent silicon; and from about 98.95 to about 99.13 weight percent aluminum.

3. Aluminum alloy magnet wire of claim 1 consisting essentially of from about 0.55 to about 0.80 weight percent iron; from about *0.015* [0.01] to about 0.07 weight percent silicon; and from about 99.15 to about 99.40 weight percent aluminum.

4. Aluminum alloy magnet wire of claim 1 consisting essentially of from about 0.55 to less than 0.60 weight percent iron; from about *0.015* [0.01] to about 0.15 weight percent silicon; and from about 99.10 to about 99.44 weight percent aluminum.

5. Aluminum alloy magnet wire of claim 1 including an outer coat selected from the group consisting of oleoresinous enamel, fabric, polyethylene, polypropylene, poly (vinyl chloride), polyurethane, *an* [and] epoxy material, a polyvinyl formal resin, an acrylic resin, [a polyvinyl formal resin on an overcoat of nylon,] a urethane modified polyvinyl formal resin, [a polyurethane base and a nylon overcoat, a modified polyester base with a linear polyester overcoat,] a polyamide resin, cotton yarn, and a polyester material.

6. Aluminum alloy magnet wire having a minimum conductivity of sixty-one percent IACS, a diameter or greatest perpendicular distance between parallel faces of between 0.128 inch and 0.0031 inch, a percentage elongation of at least fifteen percent, and a tensile strength of at least 12,000 p.s.i., said wire containing substantially evenly distributed iron aluminate inclusions in a concentration produced by the presence of about 0.45 to about 0.95 weight percent iron in an alloy mass consisting essentially of about 98.95 to less than 99.45 weight percent aluminum; *0.015 to* [no more than about] 0.15 weight percent silicon; and *0.0001 to* [less than] 0.05 weight percent each of trace elements selected from the group consisting of vanadium, copper, manganese, magnesium, zinc, boron, and titanium, *the total trace element content being from 0.004 to 0.15*, said iron aluminate inclusions having a particle size of less than 2,000 angstrom units.

7. Aluminum alloy magnet wire of claim 6 wherein iron is present in a concentration of about 0.55 to about 0.95 weight percent; silicon is present in a concentration of about *0.015* [0.01] to about 0.15 weight percent; and aluminum is present in a concentration of about 98.95 to about 99.44 weight percent.

8. Aluminum alloy magnet wire of claim 6 wherein iron is present in a concentration of about 0.80 to about 0.95 weight percent; silicon is present in a concentration of about 0.07 to about 0.15 weight percent; and aluminum is present in a concentration of about 98.95 to about 99.13 weight percent.

9. Alumuinum alloy magnet wire of claim 6 wherein iron is present in a concentration of about 0.50 to about 0.80 weight percent; silicon is present in a concentration of about *0.015* [0.01] to about 0.07 weight percent; aluminum is present in a concentration of about 99.15 to about 99.40 weight percent.

10. Aluminum alloy magnet wire of claim 6 wherein iron is present in a concentration of about 0.45 to less than 0.60 weight percent; silicon is present in a concentration of about *0.015* [0.01] to about 0.15 weight percent; and aluminum is present in a concentration of about 99.10 to about 99.54 weight percent.

11. Aluminum alloy magnet wire of claim 6 wherein iron is present in a concentration of about 0.55 to less than 0.60 weight percent; silicon is present in a concentration of about *0.015* [0.01] to about 0.15 weight percent; and aluminum is present in a concentration of about 99.10 to about 99.44 weight percent.

12. Aluminum alloy magnet wire of claim 6 including an outer coat selected from the group consisting of oleoresinous enamel, fabric, polyethylene, polypropylene, poly-(vinyl chloride), polyurethane, an epoxy material, a polyvinyl formal resin, an acrylic resin, [a polyvinyl formal resin on an overcoat of nylon,] a urethane modified polyvinyl formal resin, [a polyurethane base and a nylon overcoat, a modified polyester base with a linear polyester overcoat,] a polyimide resin, cotton yarn, and a polyester material.

13. Aluminum alloy magnet wire having a minimum conductivity of sixty-one percent IACS, a diameter or greatest perpendicular distance between parallel faces of between 1.0 inch and 0.0031 inch, a percentage elongation of at least fifteen percent, and a tensile strength of at least 12,000 p.s.i., said wire consisting essentially of from about 0.55 to about 0.95 weight percent iron; about *0.015* [0.01] to about 0.15 weight percent silicon; about 0.0001 to about 0.05 weight percent each of trace elements selected from the group consisting of vanadium, copper, manganese, magnesium, zinc, boron and titanium; and from about 98.95 to less than 99.45 weight percent aluminum, said alloy containing from about 0.004 to about 0.15 total weight percent trace elements and having an iron to silicon ratio of 8:1 or greater.

14. Aluminum alloy magnet wire having a minimum conductivity of sixty-one percent IACS, a diameter or greatest perpendicular distance between parallel faces of between 1.0 inch and 0.0031 inch, a percentage elongation of at least fifteen percent, and a tensile strength of at least 12,000 p.s.i., said wire containing substantially evenly distributed iron aluminate inclusions in a concentration produced by the presence of about 0.45 to about 0.95 weight percent iron in an alloy mass consisting essentially of about 98.95 to less than 99.45 weight percent aluminum; about *0.015* [0.01] to about 0.15 weight percent silicon; about 0.001 to about 0.05 weight percent each of trace elements selected from the group consisting of vanadium, copper, manganese, magnesium, zinc, boron, and titanium, *the total trace element content being from 0.004 to 0.15,* said iron aluminate inclusions having a particle size of less than 2,000 angstrom units.

*15. Aluminum alloy magnet wire of Claim 1 including an outer coating of a polyvinyl formal resin on an overcoat of nylon.*

*16. Aluminum alloy magnet wire of Claim 1 including an outer coating of a polyurethane base and a nylon overcoat.*

*17. Aluminum alloy magnet wire of Claim 1 including an outer coating of a modified polyester base with a linear polyester overcoat.*

*18. Aluminum alloy magnet wire of Claim 6 including an outer coating of a polyvinyl formal resin on an overcoat of nylon.*

*19. Aluminum alloy magnet wire of Claim 6 including an outer coating of a polyurethane base and a nylon overcoat.*

*20. Aluminum alloy magnet wire of Claim 6 including an outer coating of a polyurethane base and a nylon polyester overcoat.*

References Cited

The following references, cited by the Examiner, are of record in the patented file of this patent or the original patent.

UNITED STATES PATENTS

| | | | |
|---|---|---|---|
| 3,571,910 | 3/1971 | Bylund. | |
| 3,063,832 | 11/1962 | Snyder. | |
| 3,397,044 | 8/1968 | Bylund. | |
| 2,252,421 | 8/1941 | Stroup | 75—138 |
| 2,545,866 | 3/1951 | Whitzel, et al. | 29—193 |
| 3,241,953 | 3/1966 | Pryor, et al. | 75—138 |
| 3,278,300 | 10/1966 | Kioke | 75—138 |

OTHER REFERENCES

Transactions of the American Society for Metals, "The Effect of Single Addition Metals on the Recrystallization, Electrical Conductivity and Rupture Strength of Pure Aluminum," 1949, vol. 41, pp. 443 to 459.

Alloy Digest, Aluminum EC, Filing Code, Al-104, June 1961, 2 pages, published by Engineering Alloys Digest, Inc., Upper Montclair, N.J.

Horn et al., Aluminum-Conductor Cable an Alternative to Copper, Bell Laboratories Record, November 1967, pp. 314–319.

Krupotkin, Ya, et al., Effect of Small Impurities of Iron, Nickel and Cobalt on the Mechanical Properties and Electrical Conductivity of Aluminum, Izu, Vysshikh Uche Bn Zavenenii Energ 8, No. 12, pp. 112–116, 1965.

A. J. Field et al., The Electrical Conductivity of Aluminum Wire, Journal of the Institute of Metals, 1933, 51, 183, 198.

H. J. Miller, Heat Treatment and Finishing Operations in the Production of Copper and Aluminum Rod and Wire, Journal of the Institute of Metals, 1954–55 83, 221–232.

Gaston G. Gauthier, The Conductivity of Superpurity Aluminum: The Influence of Small Additions, Journal of the Institute of Metals, 1936, 59, 129–150.

ELLIOT A. GOLDBERG, Primary Examiner

U.S. Cl. X.R.

75—138; 117—232; 174—110 R